United States Patent
Konishi

(10) Patent No.: US 10,884,600 B2
(45) Date of Patent: Jan. 5, 2021

(54) DISPLAY APPARATUS SCROLLING FIRST IMAGE AND SECOND IMAGE IN ACCORDANCE WITH SPEED OF SCROLL OPERATION

(71) Applicant: KYOCERA Document Solutions Inc., Osaka (JP)

(72) Inventor: Kohei Konishi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/783,732

(22) Filed: Feb. 6, 2020

(65) Prior Publication Data
US 2020/0264767 A1    Aug. 20, 2020

(30) Foreign Application Priority Data
Feb. 19, 2019 (JP) .................. 2019-027730

(51) Int. Cl.
| | | |
|---|---|---|
| G06F 3/048 | (2013.01) | |
| G06F 3/0484 | (2013.01) | |
| G06F 3/0485 | (2013.01) | |
| G06F 3/0482 | (2013.01) | |
| G06F 3/0488 | (2013.01) | |
| G06F 3/01 | (2006.01) | |
| H04N 1/00 | (2006.01) | |

(52) U.S. Cl.
CPC ........ *G06F 3/04847* (2013.01); *G06F 3/0482* (2013.01); *G06F 3/0485* (2013.01); *G06F 3/04883* (2013.01); *H04N 1/00411* (2013.01); *H04N 1/00413* (2013.01); *H04N 2201/0094* (2013.01)

(58) Field of Classification Search
CPC .. G06F 3/04847; G06F 3/0482; G06F 3/0485; G06F 3/04883
See application file for complete search history.

(56) References Cited

U.S. PATENT DOCUMENTS

| | | | | |
|---|---|---|---|---|
| 5,884,056 A | * | 3/1999 | Steele .................. | G06F 16/739 715/738 |
| 9,317,190 B2 | * | 4/2016 | Kwak .................. | G06F 1/1652 |
| 9,619,132 B2 | * | 4/2017 | Ording ................ | G06F 3/04883 |
| 10,216,400 B2 | * | 2/2019 | Miyazaki .............. | G06F 3/0482 |
| 10,331,326 B2 | * | 6/2019 | Kawamata ............ | G06F 3/0482 |

(Continued)

FOREIGN PATENT DOCUMENTS

| | | |
|---|---|---|
| JP | 2013-114338 A | 6/2013 |
| WO | 2015129327 A1 | 9/2015 |

*Primary Examiner* — Nicholas Augustine
(74) *Attorney, Agent, or Firm* — IP Business Solutions, LLC

(57) ABSTRACT

A display apparatus includes a display device, a touch panel, and a control device. The control device functions as a controller. The controller causes the display device to display one portion of a first image including a plurality of items arrayed along a first direction. The controller calculates, upon receiving scroll operation in the first direction via the touch panel, a speed of the scroll operation, causes the display device to scroll the first image when the calculated speed is equal to or less than a first speed, and causes the display device to scroll a second image including the plurality of items arrayed along a second direction when the calculated speed exceeds the first speed.

7 Claims, 13 Drawing Sheets

(56) References Cited

U.S. PATENT DOCUMENTS

| | | | |
|---|---|---|---|
| 10,579,246 B2 * | 3/2020 | Tomiyasu | H04N 1/00474 |
| 2006/0120624 A1 * | 6/2006 | Jojic | G06F 16/739 |
| | | | 382/284 |
| 2007/0071413 A1 * | 3/2007 | Takahashi | G11B 27/28 |
| | | | 386/230 |
| 2015/0234562 A1 * | 8/2015 | Ording | G06F 3/0485 |
| | | | 715/784 |
| 2016/0274756 A1 | 9/2016 | Sakaguchi | |

\* cited by examiner

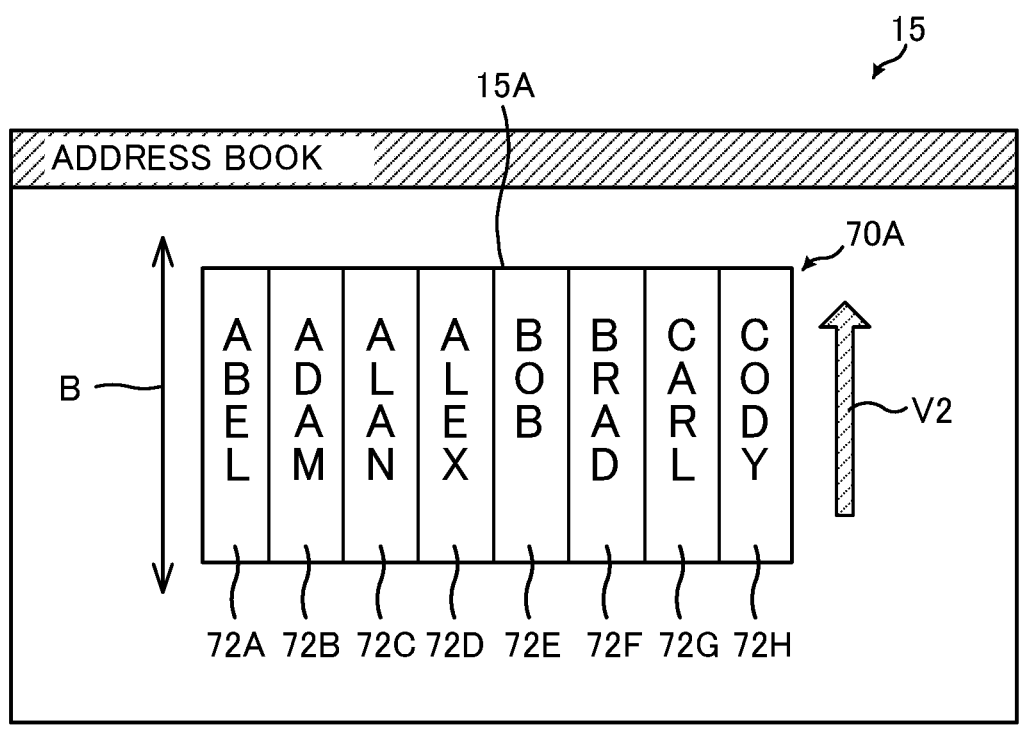

DISPLAY APPARATUS SCROLLING FIRST IMAGE AND SECOND IMAGE IN ACCORDANCE WITH SPEED OF SCROLL OPERATION

INCORPORATION BY REFERENCE

This application claims priority to Japanese Patent Application No. 2019-027730 filed on 19 Feb. 2019, the entire contents of which are incorporated by reference herein.

BACKGROUND

This disclosure relates to a display apparatus and more specifically to a technology of scrolling a display image.

Known is a technology of scrolling a display image in accordance with scroll operation performed on the display image. For example, known as a typical technology is a technology of stopping scroll at a previously marked position in scrolling a list displayed at a display device.

Known as another typical technology is a technology of identifying, from among a plurality of items listed, the item which may be overlooked by a user in a past scroll and scrolling the identified item at a speed different from a speed specified through scroll operation.

SUMMARY

A technology obtained by further improving the technology described above will be suggested as one aspect of this disclosure.

A display apparatus according to one aspect of this disclosure includes a display device, a touch panel, and a control device. The control device includes a processor and functions as a controller as a result of executing a display change program by the processor. The controller causes the display device to display, in a display region previously defined, one portion of a first image including a plurality of items arrayed along a first direction previously defined. Each of the plurality of items included in the first image includes a character string composed of a plurality of characters arrayed along a second direction orthogonal to the first direction. The controller calculates, upon receiving scroll operation in the first direction via the touch panel, a speed of the scroll operation, causes the display device to scroll the first image in the display region when the calculated speed is equal to or less than a first speed previously defined, and causes the display device to scroll, in the display region, a second image including the plurality of items arrayed along the second direction when the calculated speed exceeds the first speed previously defined. Each of the plurality of items included in the second image includes a character string composed of the plurality of characters arrayed along the first direction.

BRIEF DESCRIPTION OF THE DRAWINGS

FIGS. 8A and 8B are diagrams each illustrating one example of a mode of scroll of a linked image.

DETAILED DESCRIPTION

First Embodiment

Figure 1:
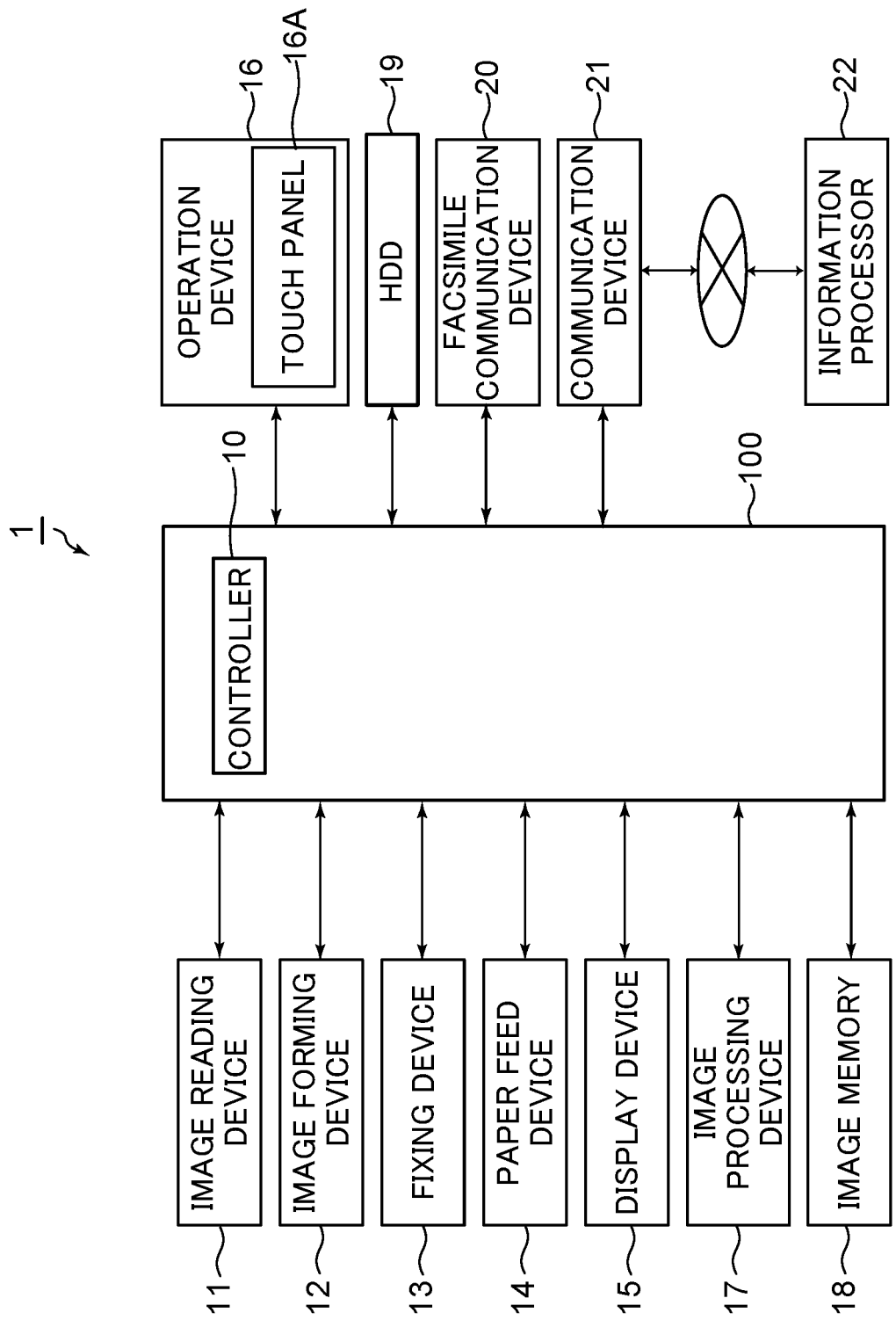
FIG. 1 is a block diagram illustrating inner configuration of an image forming apparatus according to a first embodiment of this disclosure.

Hereinafter, an image forming apparatus according to a first embodiment of this disclosure will be described with reference to the drawings. FIG. 1 is a block diagram illustrating inner configuration of the image forming apparatus according to the first embodiment of this disclosure. Referring to FIG. 1, the image forming apparatus 1 is one example of a display apparatus in What is claimed is.

The image forming apparatus 1 is a multifunction peripheral combining together a plurality of functions such as a facsimile function, a copy function, a printer function, and a scanner function. The image forming apparatus 1 includes a control device 100. The control device 100 includes a processor, a random access memory (RAM), a read only memory (ROM), etc. The processor is, for example, a central processing unit (CPU), a micro processing unit (MPU), or an application specific integrated circuit (ASIC).

The control device 100 functions as a controller 10 as a result of executing a control program stored in the built-in ROM or a hard disc drive (HDD) 19 by the processor.

Note that the controller 10 may be operably formed by a hardware circuit without depending on operation performed based on the control program or may be realized by being formed by two or more control devices.

The control device 100 is electrically connected to: an image reading device 11, an image forming device 12, a fixing device 13, a paper feed device 14, a display device 15, an operation device 16, an image processing device 17, an image memory 18, the HDD 19, a facsimile communication device 20, a communication device 21, etc.

The controller 10 is in charge of overall control of the image forming apparatus 1. More specifically, the controller 10 controls, for example, operation of the various devices of the image forming apparatus 1 and communication with a personal computer (PC) connected via a network or an information processor 22 such as a mail server.

The image reading device 11 is an auto document feeder (ADF) including: a document conveyance device which conveys a document; and a scanner which optically reads the document conveyed by the document conveyance device or a document loaded on platen glass. The image reading device 11 irradiates the document by a light irradiation device and receives reflected light by a charge-coupled device (CCD) sensor to thereby read the document, etc. and generate image data.

The image forming device 12 includes a photoconductive drum, a charging device, an exposure device, a developing device, and a transfer device. Based on, for example, the image data generated by the image reading device 11, the image forming device 12 forms an image formed of a toner image on recording paper supplied from the paper feed device 14.

The fixing device 13 heats or pressurizes the recording paper, on a surface of which the toner image has been formed by the image forming device 12, to thereby fix the toner image on the recording paper. The recording paper on which the toner image has been fixed by the fixing device 13 is discharged onto a discharge tray.

The paper feed device 14 individually draws the recording paper stored in a paper cassette or recording paper loaded on a manual tray by a pickup roller and delivers the recording paper to the image forming device 12.

The display device 15 is a display apparatus formed of a liquid crystal display or the like. The display device 15 displays various screens related to various functions executable by the image forming apparatus 1.

The operation device 16 includes a touch panel 16A arranged in a manner such as to be superposed on the display device 15. The operation device 16 includes a plurality of hard keys such as a start key for instructing start of executing the various functions. The user inputs, through the touch panel 16A, instructions for the various functions executable by the image forming apparatus 1.

When the user has performed scroll operation such as flip operation or swipe operation on an image displayed at the display device 15, the touch panel 16A detects: a first position at which a user's finger makes first contact with the image; and a second position at which the user's finger separates from the image.

The image processing device 17 executes image processing on the image data generated by the image reading device 11 when necessary.

The image memory 18 includes a region where the image data generated by the image reading device 11 and subjected to printing is temporarily stored.

The HDD 19 is a large-capacity storage device which stores various pieces of data such as the image data generated by the image reading device 11. The HDD 19 stores various control programs for realizing typical operation of the image forming apparatus 1.

The HDD 19 stores a display change program for executing display change processing according to this embodiment. The processer described above operates in accordance with the display change program to thereby execute the display change processing as the controller 10. The display change program is included in the aforementioned various control programs.

The HDD 19 previously stores, as address book data for a plurality of previously registered people, names and e-mail addresses of the registered people in association with each other. Here, the address book data includes information of 10 registered people. The user can use the transmission function included in the image forming apparatus 1 to thereby transmit an e-mail destined to the e-mail address stored in the address book data.

The facsimile communication device 20 makes connection to a public line and performs image data transmission and reception via the public line.

The communication device 21 includes a communication module such as a local area network (LAN). The image forming apparatus 1 performs data communication with the information processor 22 on the network via the communication device 21.

As a result of connecting a power source to the various devices of the image forming apparatus 1 and supplying a power from this power source, the various devices of the image forming apparatus 1 operate.

[Operation]

Figure 2A:
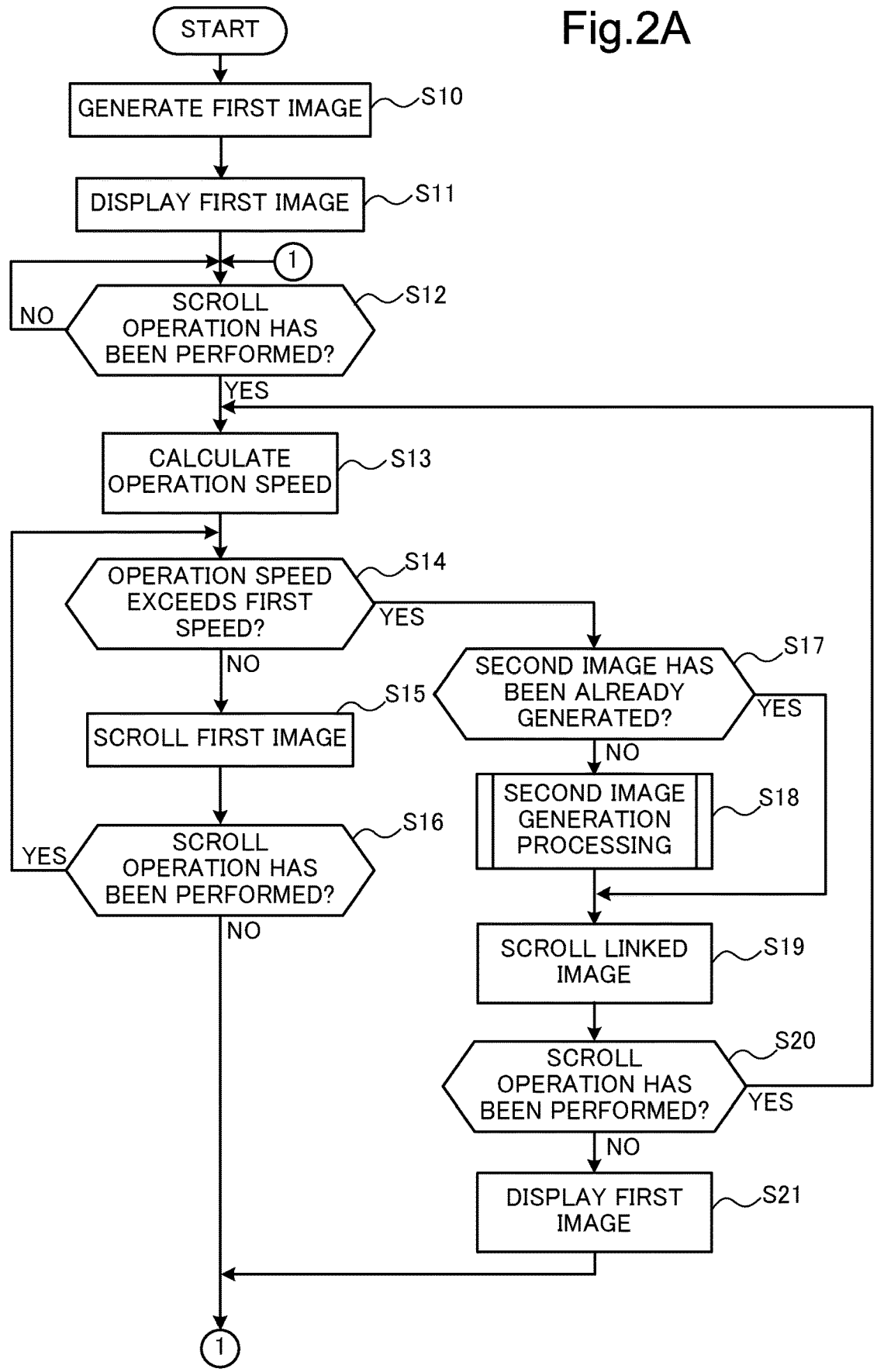
FIG. 2A is a flowchart illustrating display change processing.

FIG. 2A is a flowchart illustrating the display change processing. Hereinafter, a structure for controlling the display change program executed by the image forming apparatus 1 for the purpose of executing the display change processing will be described in connection to the operation of the image forming apparatus 1. As a result of inputting an instruction for selecting the address book function by the user via the touch panel 16A, the execution of this display change program is started by the controller 10.

Upon power supply to the image forming apparatus 1, the controller 10 causes the display device 15 to display a home screen for selecting any of the plurality of functions executable by the image forming apparatus 1.

Figure 3:
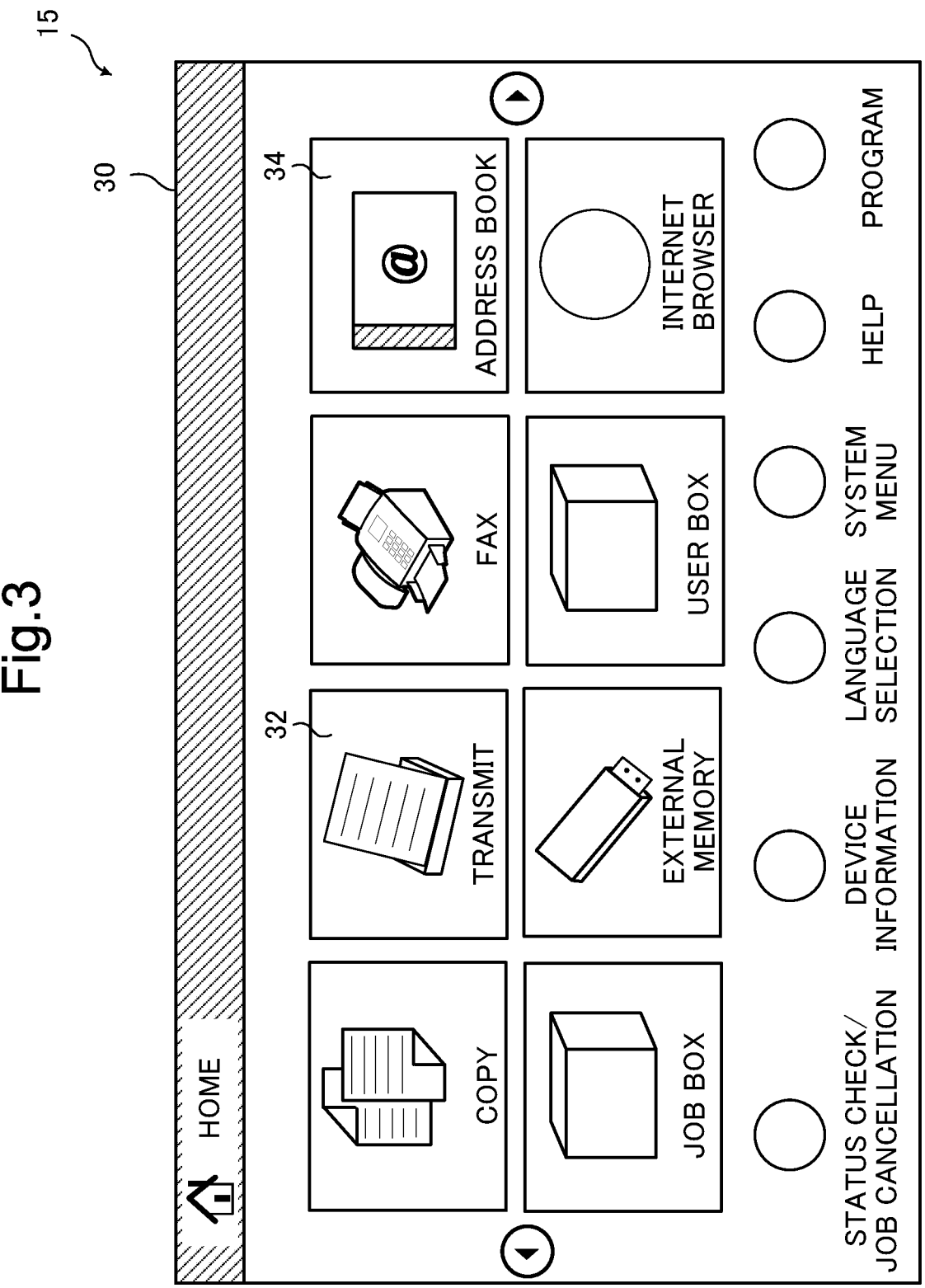
FIG. 3 is a diagram illustrating one example of a home screen.

FIG. 3 is a diagram illustrating one example of the home screen. Referring to FIG. 3, the controller 10 causes the home screen 30 to display: as soft keys, a key 32 for selecting the transmission function; a key 34 for selecting the address book function; etc.

Assumed is that the user has checked the home screen 30 and has touched the key 34. Referring to FIG. 2A, upon detection of touch operation on the key 34 via the touch panel 16A, the controller 10 generates a first image based on the address book data stored in the HDD 19 (step S10).

Figure 4:
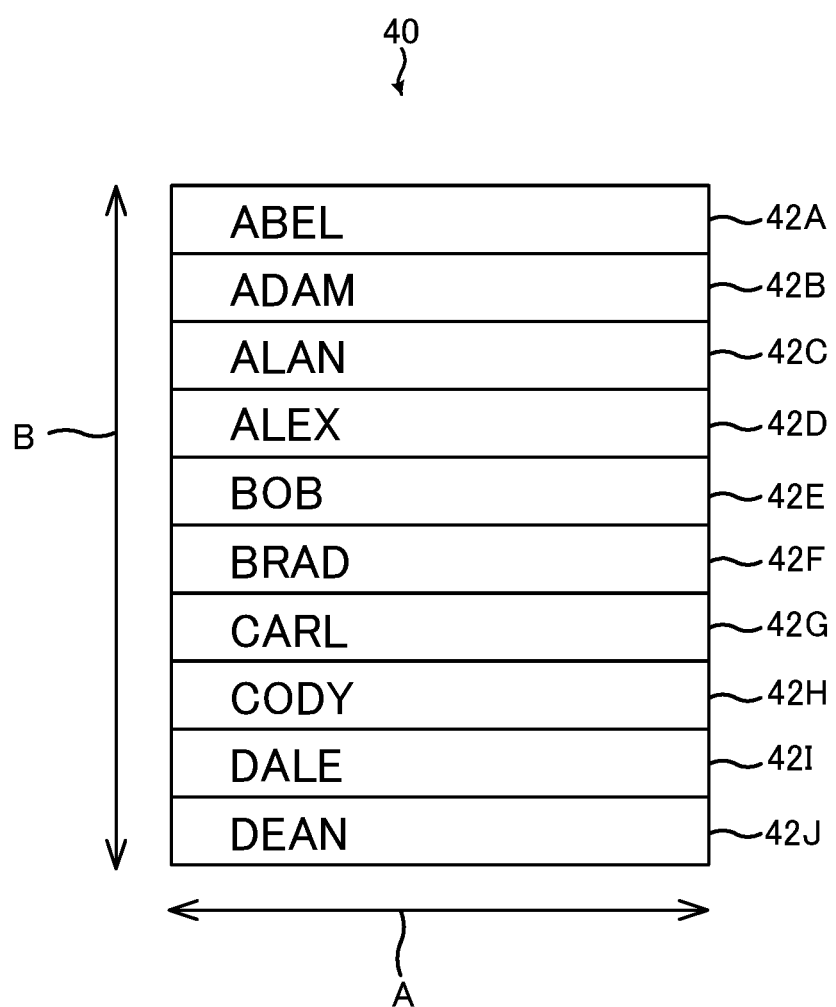
FIG. 4 is a diagram illustrating one example of a first image.

FIG. 4 is a diagram illustrating one example of the first image. Referring to FIG. 4, the controller 10 generates a first image 40 including ten items 42A to 42J. The items 42A to 42J respectively include character strings respectively indicating the names of the ten registered people indicated by the address book data. Each of the character strings included in the items 42A to 42J is expressed in horizontal writing and composed of a plurality of characters arrayed along a horizontal direction A.

The items 42A to 42J in the first image 40 are arrayed along a vertical direction B orthogonal to the horizontal direction A. The items 42A to 42J are arranged in order just mentioned in a manner such that first characters respectively included in the character strings of the items 42A to 42J are arrayed by the order of the Japanese syllabary. Note that the vertical direction B is one example of a first direction in What is claimed is. The horizontal direction A is one example of a second direction in What is claimed is.

Assumed is that the character strings respectively included in the items 42A to 42D and the items 42F to 42J are composed of four characters. Assumed is that the character string included in the item 42E is composed of three characters.

The controller 10 generates the first image 40 in a manner such that a size of the characters included in the items 42A to 42J is a predefined size. Here, a description will be given, referring to 15 pixels as one example of the predefined size.

After generating the first image 40, the controller 10 causes the display device 15 to display one portion of the first image 40 in a display region previously defined (step S11). After displaying the first image 40, the controller 10 stands by until scroll operation is received. At this point, the controller 10 repeats processing of determining that the scroll operation has not been received (NO in step S12).

Figure 5:
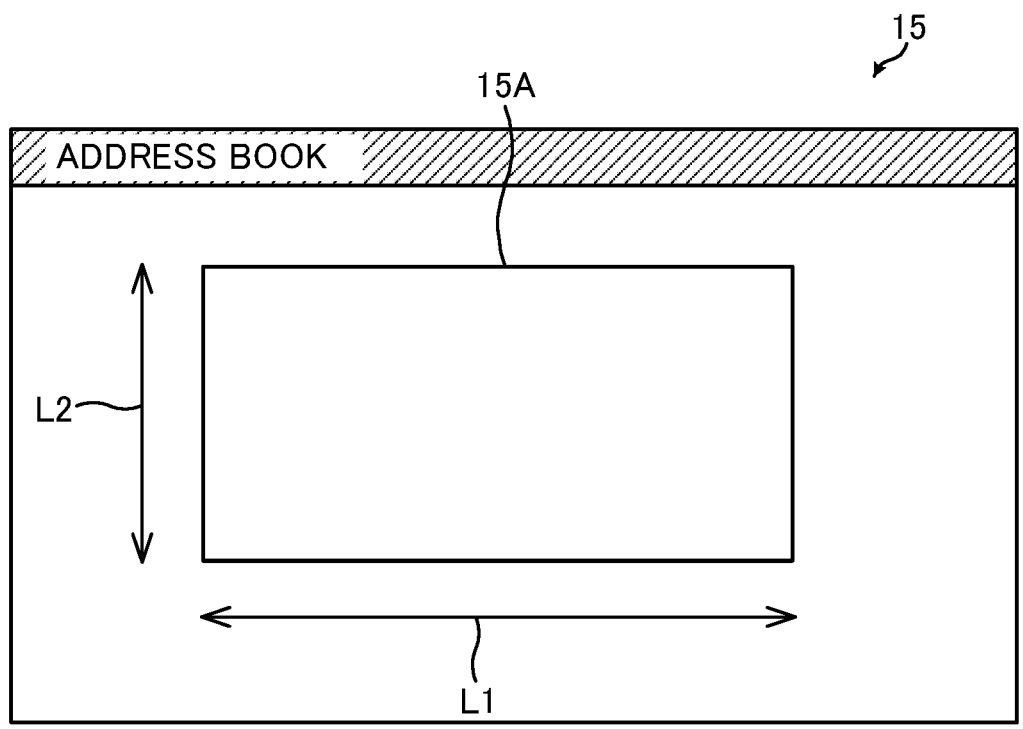
FIG. 5 is a diagram illustrating one example of a display region.

FIG. 5 is a diagram illustrating one example of the display region. Referring to FIG. 5, the controller 10 previously sets the display region 15A as a region for displaying the first image 40. The controller 10 sets a length L1 of the display region 15A in the horizontal direction A to be more than a length L2 of the display region 15A in the vertical direction B.

Assumed here is that the controller 10 previously sets the length L1 to be twice the length L2. The length L2 is a length corresponding to a length of four characters of a 15-pixel size. Therefore, the length L1 is a length corresponding to a length of eight characters of a 15-pixel size.

A maximum number of the characters composing the character strings respectively included in the items 42A to 42J is four, which is a number of characters stored within the length L1. Therefore, the controller 10 generates the first image 40 in a manner such that a length of the first image 40 in the horizontal direction A is identical to the length L1 of the display region 15A in the horizontal direction A.

As described above, the controller 10 generates the first image 40 in a manner such that the size of the characters included in the first image 40 is 15 pixels. In this case, the controller 10 cannot display all the ten items 42A to 42J on the display region 15A at once. Thus, the controller 10 displays, in the display region 15A, the four items included in the items 42A to 42J and corresponding to the number of characters storable within the length L2.

Figure 6:
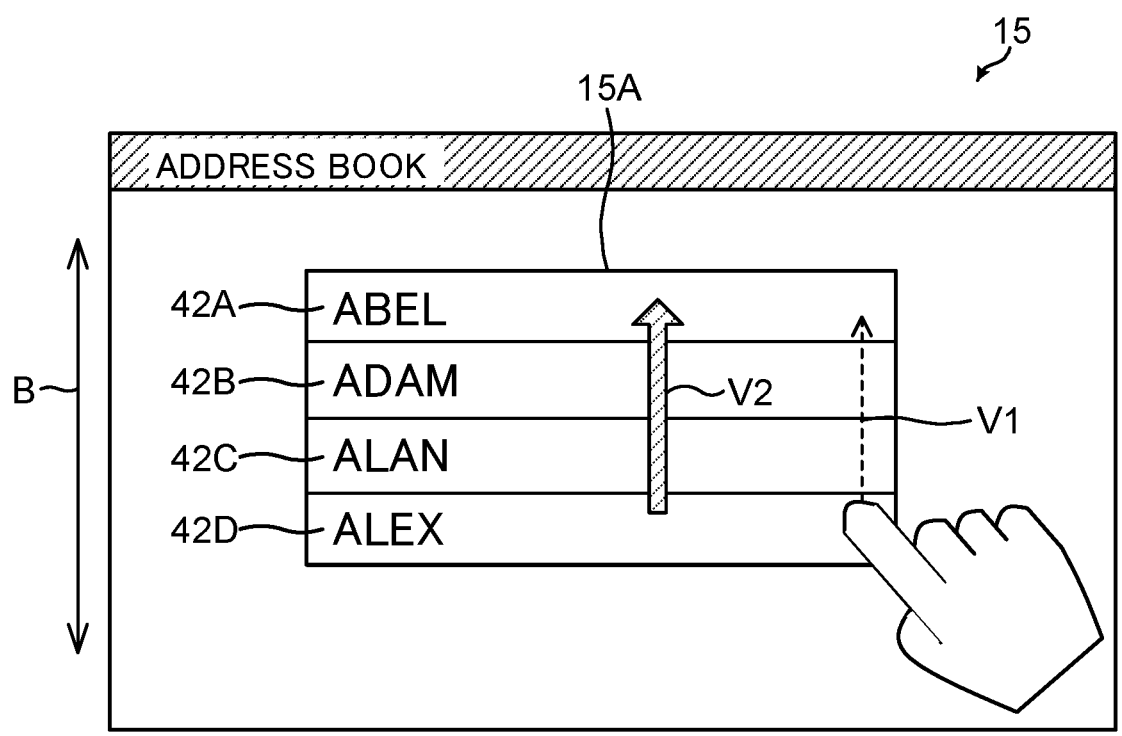
FIG. 6 is a diagram illustrating one example of a display mode of the first image.

FIG. 6 is a diagram illustrating one example of a display mode of the first image. In this case, the controller 10 displays, in the display region 15A as one portion of the first image 40, the four items 42A to 42D as part of the items included in the items 42A to 42J. As described above, the number of items of the first image 40 displayable in the display region 15A at once (hereinafter written as "first item number") is "four".

Assumed is that the user has checked the items 42A to 42J displayed in the display region 15A and has performed, on the first image 40, flick operation in the vertical direction B upwardly to the item 42A arrayed at the beginning. Hereinafter, a direction towards the item arrayed at the beginning is written as an upward direction and a direction towards the item arrayed at the end is written as a downward direction.

Upon detection of the aforementioned flick operation by the touch panel 16A, the controller 10 determines that the scroll operation has been received (YES in step S12), and calculates a speed V1 of the scroll operation (hereinafter written as "operation speed") in the vertical direction B (step S13).

More specifically, the controller 10 calculates a distance from the first position to the second position based on the first position and the second position detected by the touch panel 16A, and calculates the operation speed V1 based on the calculated distance and time from when the user's finger touches the image (the first image 40 in this case) displayed at the display device 15 to when the user's finger separates from the aforementioned image.

After calculating the operation speed V1, the controller 10 determines whether or not the calculated operation speed V1 exceeds a first speed previously defined (step S14). The first speed is not specifically limited as long as the first speed is previously defined by the user or the like. Assumed here is that a speed at which all the plurality of items displayed in the display region 15A are switched twice through scroll executed in accordance with one scroll operation is set as the first speed.

(1) When the Operation Speed is Equal to or Less than the First Speed

Assumed is that the user has performed slow flick operation to display the desired item 42F in the display region 15A. In this case, the controller 10 determines that the operation speed V1 is equal to or less than the first speed (NO in step S14) and causes the display device 15 to scroll the first image 40 in the display region 15A (step S15).

More specifically, the controller 10 causes the display device 15 to scroll the first image 40 in an upward direction as a direction of the flick operation in accordance with a display speed V2 set in accordance with the operation speed V1.

When an amount of movement of the first image 40 has reached an amount of scroll set in accordance with, for example, the display speed V2 or the distance from the first position to the second position, the controller 10 ends the scroll of the first image 40. Assumed is that the items 42C to 42F are displayed in the display region 15A at a time point at which the scroll has ended.

The controller 10 determines whether or not the scroll operation has been received during the scroll of the first image 40 (step S16). Upon checking that the desired item 42F is displayed in the display region 15A, the user does not perform the flick operation again. Therefore, the scroll operation is not detected by the touch panel 16A during the scroll of the first image 40.

The controller 10 determines that the scroll operation has not been received during the scroll of the first image 40 (NO in step S16), returning to the processing in step S12.

On the other hand, when the flick operation on the first image 40 has been performed again by the user during the scroll of the first image 40, the controller 10 determines that the scroll operation has been received (YES in step S16), returning to the processing in step S14.

(2) When the Operation Speed Exceeds the First Speed

Assumed is that the user has performed quick flick operation to display the desired item 42J in the display region 15A. In this case, the controller 10 determines that the operation speed V1 exceeds the first speed (YES in step S14), and determines whether or not second images have been generated (step S17).

In this case, the controller 10 determines that the second images have not been generated (NO in step S17), and executes second image generation processing to thereby generates the second images based on the address book data stored in the HDD 19 (step S18).

Figure 7:
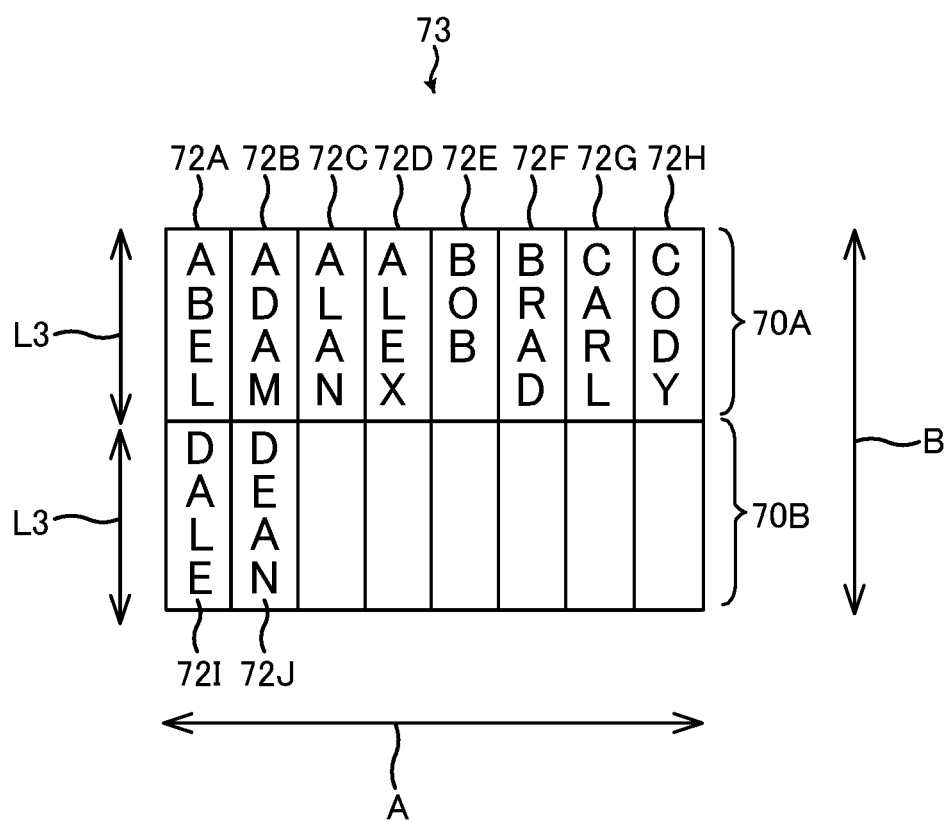
FIG. 7 is a diagram illustrating one example of second images.

FIG. 7 is a diagram illustrating one example of the second images. Referring to FIG. 7, the controller 10 generates a second image 70A including items 72A to 72H arrayed along the horizontal direction A. The controller 10 also generates a second image 70B including items 72I and 72J arrayed along the horizontal direction A. The second images 70A and 70B are linked together in order just mentioned along the vertical direction B. Hereinafter, an image obtained by linking together the second images 70A and 70B is written as a linked image 73.

The items 72A to 72J respectively correspond to the items 42A to 42J included in the first image 40. That is, contents of character strings respectively included in the items 72A to 72J are identical to contents of the character strings respectively included in the items 42A to 42J.

The character strings included in the items 72A to 72J are expressed in vertical writing and composed of a plurality of characters arrayed along the vertical direction B. Hereinafter, second image generation processing for generating the second images 70A and 70B will be described in detail.

[Second Image Generation Processing]

Figure 2B:
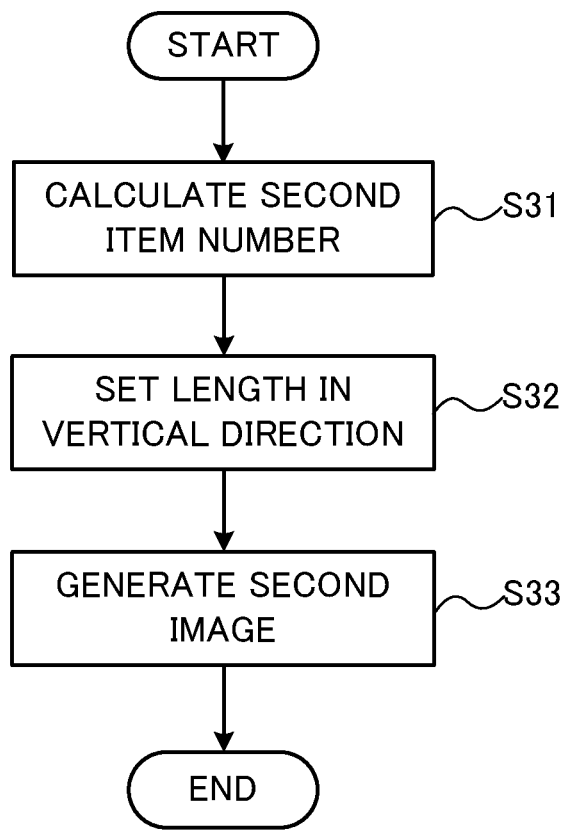
FIG. 2B is a flowchart illustrating second image generation processing.

FIG. 2B is a flowchart illustrating the second image generation processing. Referring to FIG. 2B, upon generating the second images in a manner such that the size of the characters included in the first image 40 is identical to a size of the characters included in the second images, the controller 10 calculates a number of items (hereinafter referred to as "second item number") displayable in the display region 15A at once for the second images in the second image generation processing (step S31).

In this case, the length L1 of the display region 15A in the horizontal direction A is twice the length L2 of the display region 15A in the vertical direction B, and thus the second item number is twice the first item number. Therefore, the controller 10 calculates "8" as "the second item number".

After calculating the second item number, the controller 10 sets the length of the second images in the vertical direction B in accordance with a maximum number of characters respectively composing the character strings respectively included in the items 72A to 72J (step S32).

In this case, the maximum number of characters respectively composing each of the character strings respectively included in the items 72A to 72J is four, and thus the controller 10 sets the length of the second images in the vertical direction B as a length corresponding to a length of four characters of a 15-pixel size. In this case, the controller 10 sets the length of the second images in the vertical direction B to be identical to the length L2 of the display region 15A in the vertical direction B.

After setting the length of the second images in the vertical direction B, the controller 10 generates the second images based on the second item number and the set length of the second images in the vertical direction B (step S33).

More specifically, the controller 10 first generates the plurality of items 72A to 72J to be included in the second images based on the address book data stored in the HDD 19 and distributes, in accordance with the "eight" provided as the second item number, the plurality of items 72A to 72J generated. In this case, the controller 10 divides the ten items 72A to 72J into the eight items 72A to 72H and the remaining two items 72I and 72J for the distribution.

After distributing the items, the controller 10 generates the second image 70A in which the eight distributed items 72A to 72H are arrayed along the horizontal direction A and the second image 70B in which the items 72I and 72J are arrayed along the horizontal direction A. The controller 10 generates the second images 70A and 70B in a manner such that the length of the second images 70A and 70B in the vertical direction B is identical to the set length, that is, the length identical to the length L2 of the display region 15A in the vertical direction B. The second images 70A and 70B generated are displayable in the display region 15A at once. The controller 10 links together the second images 70A and 70B along the vertical direction B in order just mentioned to thereby generate the linked image 73. The linked image 73 is stored into the HDD 19.

Referring to FIG. 2A again, upon generating the linked image 73 through the second image generation processing, the controller 10 causes the display device 15 to scroll the linked image 73 in the display region 15A (step S19).

(2-1) When the Scroll Operation is not Detected

Figure 8B:
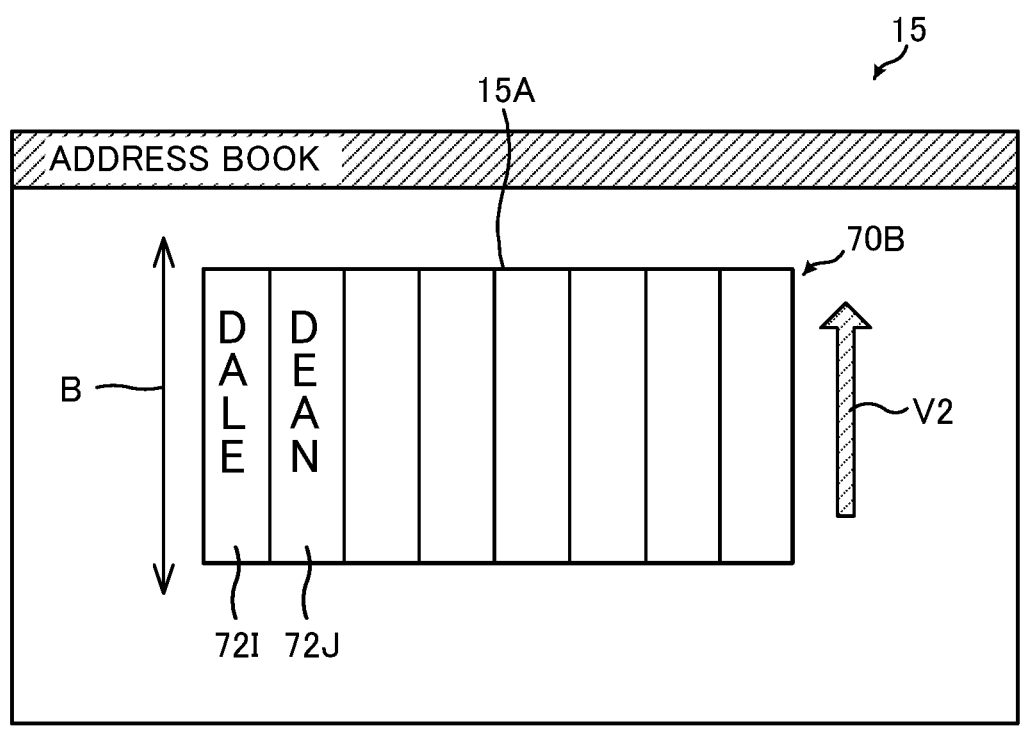

FIGS. 8A and 8B each illustrate one example of a mode of the scroll of the linked image. Referring to FIG. 8A, the controller 10 causes the display device 15 to scroll the linked image 73 in the upward direction as the direction of the flick operation in accordance with the display speed V2 set in accordance with the operation speed V1 in step S18.

At this point, the controller 10 starts the scroll at a portion corresponding to the items 42A to 42D displayed in the display region 15A at a time point at which the flick operation has been performed. That is, the controller 10 starts the scroll with the second image 70A including the items 72A to 72D corresponding to the items 42A to 42D.

Referring to FIG. 8B, the controller 10 finally causes the display device 15 to display the second image 70B in the display region 15A through the scroll described above. In this case, before an amount of movement of the linked image 73 reaches an amount of scroll set in accordance with, for example, the display speed V2 or the distance from the first position to the second position, a lower end part of the second image 70B in the vertical direction B is displayed in the display region 15A. When the lower end part of the second image 70B in the vertical direction B has been displayed in the display region 15A, the controller 10 ends the scroll of the linked image 73.

The controller 10 determines whether or not the scroll operation has been received during the scroll of the linked image 73 (step S20). Upon checking that the item 72J corresponding to the desired item 42J is displayed in the display region 15A, the user does not perform the flick operation again. Therefore, the scroll operation is not detected by the touch panel 16A during the scroll of the linked image 73.

The controller 10 determines that the scroll operation has not been received during the scroll of the linked image 73 (NO in step S20), and causes the display device 15 to display, in the display region 15A, a portion of the first image 40 corresponding to the second image 70B displayed in the display region 15A at the end of the scroll of the linked image 73 performed based on the already received scroll operation in the vertical direction B (step S21).

In this case, the controller 10 causes the display device 15 to display, in the display region 15A, a portion of the first image 40 including the items 42I and 42J corresponding to the items 72I and 72J included in the second image 70B. After displaying the first image 40, the controller 10 returns to the processing in step S12.

(2-2) When the Scroll Operation is Detected

When the flick operation has been performed on the second image 70A by the user during the scroll of the linked image 73, the controller 10 determines that the scroll operation has been received (YES in step S20), and executes the processing of steps 13 and 14 in the same manner as described above.

(2-2-1) when the Operation Speed is Equal to or Less than the First Speed

When the user has performed slow flick operation, the controller 10 determines that the operation speed V1 is equal to or less than the first speed (NO in step S14) and causes the display device 15 to scroll the first image 40 in the display region 15A (step S15).

At this point, the controller 10 starts scroll, in the display region 15A, at a portion of the first image 40 corresponding to the second image 70A displayed in the display region 15A at a time point at which the aforementioned flick operation has been received. For example, the controller 10 starts the scroll of the first image 40 at a portion including the items 42E to 42H corresponding to a latter half portion of the items 72A to 72H included in the second image 70A.

After scrolling the first image 40, the controller 10 executes the processing in steps S16 beyond in the same manner as described above.

(2-2-2) when the Operation Speed Exceeds the First Speed

When the user has performed quick flick operation, the controller 10 determines that the operation speed V1 exceeds the first speed (YES in step S14) and determines whether or not the second images have been generated (step S17).

In this case, the controller 10 determines that the second image has been generated (YES in step S17) and causes the display device 15 to continuously scroll the linked image 73 in the display region 15A (step S19). After scrolling the linked image 73, the controller 10 executes the processing in steps S20 beyond in the same manner as described above.

If a speed of the scroll is fast upon scrolling an image including the character string composed of the plurality of characters arrayed along a direction different from a direction of the scroll operation, there arises a problem that the user has difficulties in visually following contents of the character string and understanding the contents of the character string.

The typical technology described above simply stops the scroll and decreases the scroll speed and thus cannot resolve the aforementioned problem.

In contrast, according to the first embodiment described above, the controller 10 causes the display device 15 to display one portion of the first image 40 in the display region 15A. Upon receiving the scroll operation in the vertical direction B via the touch panel 16A, the controller 10 calculates the operation speed V1, and causes the display device 15 to scroll the first image 40 when the operation speed V1 is equal to or less than the first speed. The controller 10 causes the display device 15 to scroll the linked image 73 including the second images 70A and 70B when the operation speed V1 exceeds the first speed.

As described above, when the operation speed V1 exceeds the first speed, that is, when the speed of the scroll is fast, the linked image 73 including the character strings composed of the plurality of characters arrayed along the vertical direction B serving as a direction of the scroll operation is scrolled. Therefore, the user more easily and visually follow the contents of the character strings than he or she does when the first image 40 including the character strings composed of the plurality of characters arrayed along the horizontal direction A, which is different from the direction of the scroll, is scrolled. Therefore, even when the speed of the scroll is fast, the user can easily understand the contents of the character strings included in the scroll image.

Moreover, according to the first embodiment described above, when additional scroll operation in the vertical direction B has not been received via the touch panel 16A during the scroll of the linked image 73, the controller 10 causes the display device 15 to display a portion corresponding to the second image 70B displayed in the display region 15A at a time point at which the scroll of the linked image 73 performed based on the already received scroll operation in the vertical direction B had ended.

As described above, upon the ending of the scroll of the linked image 73, the first image 40 is displayed in the display region 15A, thus making it possible to check the contents of the character strings included in the first image 40 when the scroll is not executed.

Moreover, according to the first embodiment described above, upon receiving the scroll operation in the vertical direction B via the touch panel 16A during the scroll of the linked image 73, the controller 10 calculates the operation speed V1. When the operation speed V1 is equal to or less than the first speed, the controller 10 causes the display device 15 to scroll, in the display region 15A, the first image 40 from the portion of the first image 40 corresponding to one portion of the linked image 73 displayed in the display region 15A at a time point at which the scroll operation has been received. When the operation speed V1 exceeds the first speed, the controller 10 causes the display device 15 to continue the scroll of the linked image 73.

Consequently, the user can switch the image obtained during the scroll between the first image 40 and the linked image 73 in accordance with the speed of the scroll operation, thus improving user convenience.

Moreover, according to the first embodiment described above, the controller 10 sets the length L1 of the display region 15A in the horizontal direction A to be greater than the length L2 in the vertical direction B. The controller 10 causes the display device 15 to display the linked image 73 so that the size of the characters included in the first image 40 is identical to the size of the characters included in the linked image 73.

Consequently, the number of items displayable in the display region 15A at once is greater when the linked image 73 in which the plurality of items 72A to 72J are arrayed in the horizontal direction A is displayed than when the first image 40 in which the plurality of items 42A to 42J are arrayed along the vertical direction B is displayed. Therefore, the scroll of the linked image 73 makes it possible to more shorten time required until the item desired by the user is displayed than time required when the first image 40 is scrolled.

Second Embodiment

An image forming apparatus 1 according to the second embodiment of this disclosure is identical to the one according to the first embodiment except for points that the second image generation processing is different and that a mode of scroll of second images is different, and thus the differences from the first embodiment will be described below.

[Operation]

Hereinafter, the operation of the image forming apparatus 1 according to the second embodiment will be described. Note that the same operation as that of the first embodiment will not be described repeatedly.

[Second Image Generation Processing]

Figure 9:
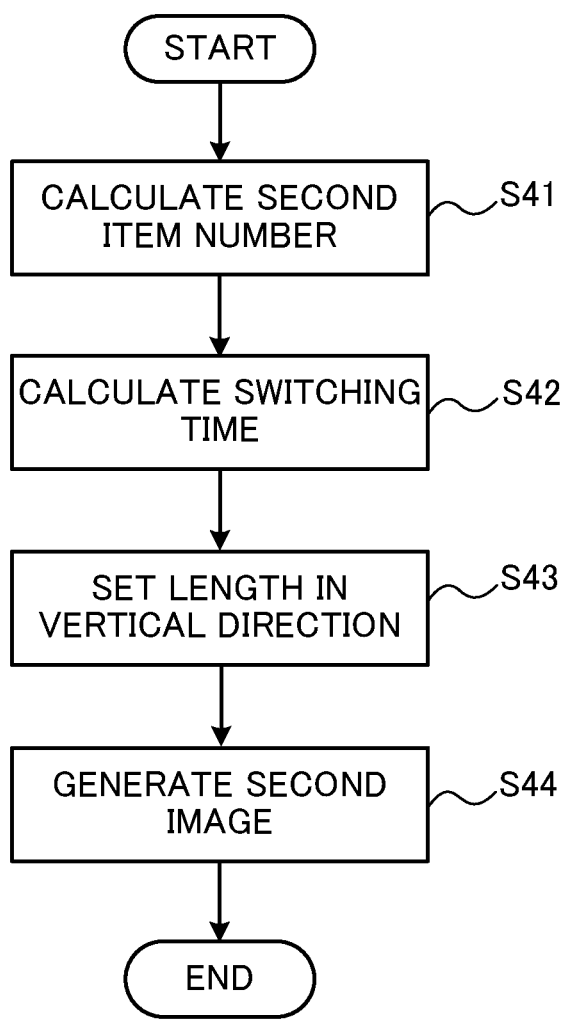
FIG. 9 is a flowchart illustrating another example of the second image generation processing.

FIG. 9 is a flowchart illustrating another example of the second image generation processing. Referring to FIG. 9, the controller 10 calculates a second item number in the second image generation processing according to the second embodiment in the same manner as in the processing in step S31 (step S41). In this case, the controller 10 calculates "8" as the second item number.

After calculating the second item number, the controller 10 calculates switching time required until all the four items 42A to 42D currently displayed in the display region 15A are completely switched to the other four items 42E to 42H upon scrolling the first image 40 in accordance with the display speed V2 (step S42).

After calculating the switching time, the controller 10 sets, based on the second item number, the length of the second images in the vertical direction B so that a number of characters displayed in the display region 15A agrees with a maximum number of characters displayable on the second images in scrolling the first image 40 at the display speed V2 for the switching time (step S43).

Here, the agreement between the numbers of characters indicates bringing a difference between the numbers of characters to be equal to or less than a predefined value. The predefined value is not specifically limited as long as the numbers of characters become almost equal to each other. The predefined value will be described, referring to "2" here.

In this case, the controller 10 first calculates, as a number of characters displayed in the display region 15A through the aforementioned scroll of the first image 40, "31" which indicates a total number of characters included in the items 42A to 42H. Since the second item number, that is, the number of characters of the second images arrayed in the horizontal direction A is "8" which is indicated by the second item number, the controller 10 sets the length of the second images in the vertical direction B at a length corresponding to a length of four characters of a 15-pixel size so that a difference between the maximum number of characters that can be included in the second images and "31" is a value within "2". Consequently, the maximum number of characters that can be included in the second images is "32".

After setting the length of the second images in the vertical direction B, the controller 10 generates the second images 70A and 70B based on the second item number and the set length of the second images in the vertical direction B in the same manner as in the processing in step S33 described above (step S44). At this point, the controller 10 does not link together the second images 70A and 70B. Each of the generated second images 70A and 70B is stored into the HDD 19.

Referring to FIG. 2A, upon generating the second images 70A and 70B through the second image generation processing, the controller 10 causes the display device 15 to scroll the second images 70A and 70B in the display region 15A (step S19).

Figure 10:
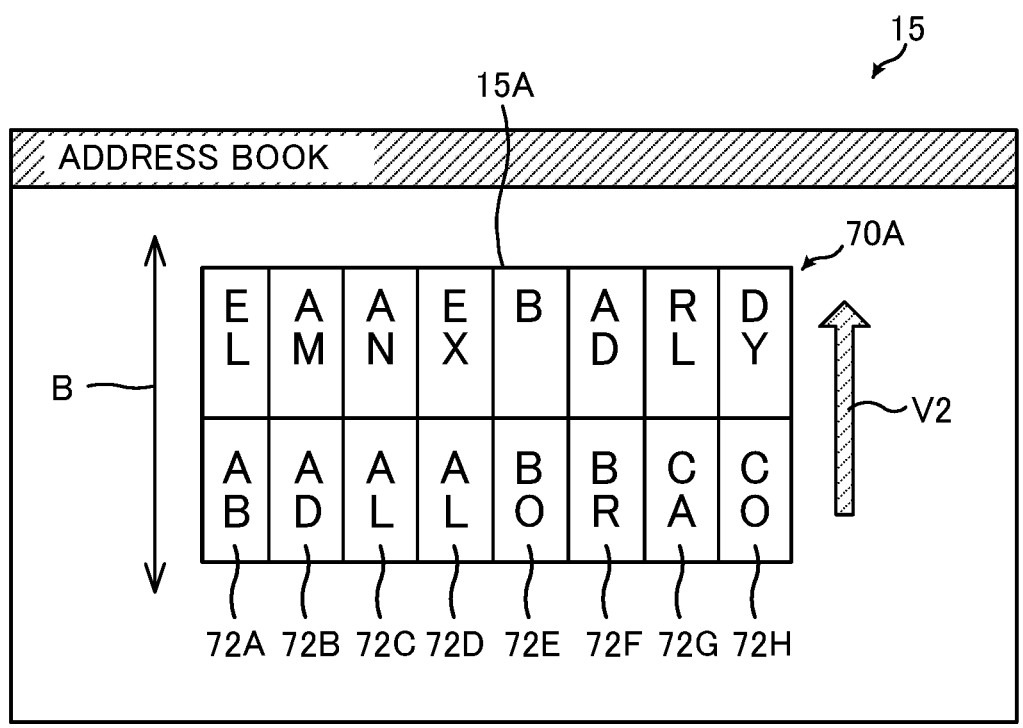
FIG. 10 is a diagram illustrating one example of a mode of scroll of the second image.

FIG. 10 is a diagram illustrating another example of the mode of the scroll of the second image. Referring to FIG. 10, the controller 10 causes the display device 15 to repeatedly scroll the second image 70A in accordance with the display speed V2 until passage of the switching time since the reception of the scroll operation in the vertical direction B.

Upon the passage of the switching time since the reception of the scroll operation in the vertical direction B, the controller 10 causes the display device 15 to scroll the second image 70B.

According to the second embodiment described above, the controller 10 sets the length of the second images 70A and 70B in the vertical direction B so that the number of characters displayed in the display region 15A agrees with the maximum number of characters that can be included in the second images in scrolling the first image 40 in accordance with the display speed V2 for the switching time. The controller 10 also causes repeated scroll of the second image 70A until the passage of the switching time since the reception of the scroll operation.

Consequently, a volume of information displayed upon scrolling the first image 40 can be brought into agreement with a volume of information displayed upon scrolling the second image 70A. Moreover, since the second image 70A is repeatedly scrolled, it is possible to repeatedly check the contents of the character strings included in the second image 70A. Therefore, the user can more easily understand the contents of the character strings included in the scroll image even when the speed of the scroll is fast.

Other Modified Embodiments

In the first and second embodiments described above, the controller 10 executes the display change program upon receiving the instruction for selecting the address book function via the touch panel 16A, but this disclosure is not limited to such embodiments. For example, the controller 10 may be configured in a manner such as to set, as a language (hereinafter written as "displayed language") which the controller 10 causes the display device 15 to display, a language previously defined as a language written in horizontal and vertical directions and also to execute the display change program upon receiving the aforementioned instruction via the touch panel 16A.

In this case, the controller 10 does not execute the display change program when a language previously defined as a language only written in the horizontal direction has been set as the displayed language and also when the aforementioned instruction has been received via the touch panel 16A, and causes the scroll of the first image 40 without scrolling the linked image 73 or the second images 70A and 70B even when the operation speed V1 exceeds the first speed.

The language previously defined as the language written in the horizontal and vertical directions is not specifically limited, but an example of such a language is Japanese, Chinese, and the like. The language previously defined as the language only written in the horizontal direction is not specifically limited, but an example of such a language is English, Greek, and the like.

As described above, the controller 10 causes the display device 15 to scroll the linked image 73 or the second images 70A and 70B in the display region 15A when the characters included in the first image 40 are in the language previously defined as the language written in the horizontal vertical directions and also when the operation speed V1 exceeds the first speed. Consequently, the user can more easily understand the contents of the character strings included int the scroll image.

Figure 11:
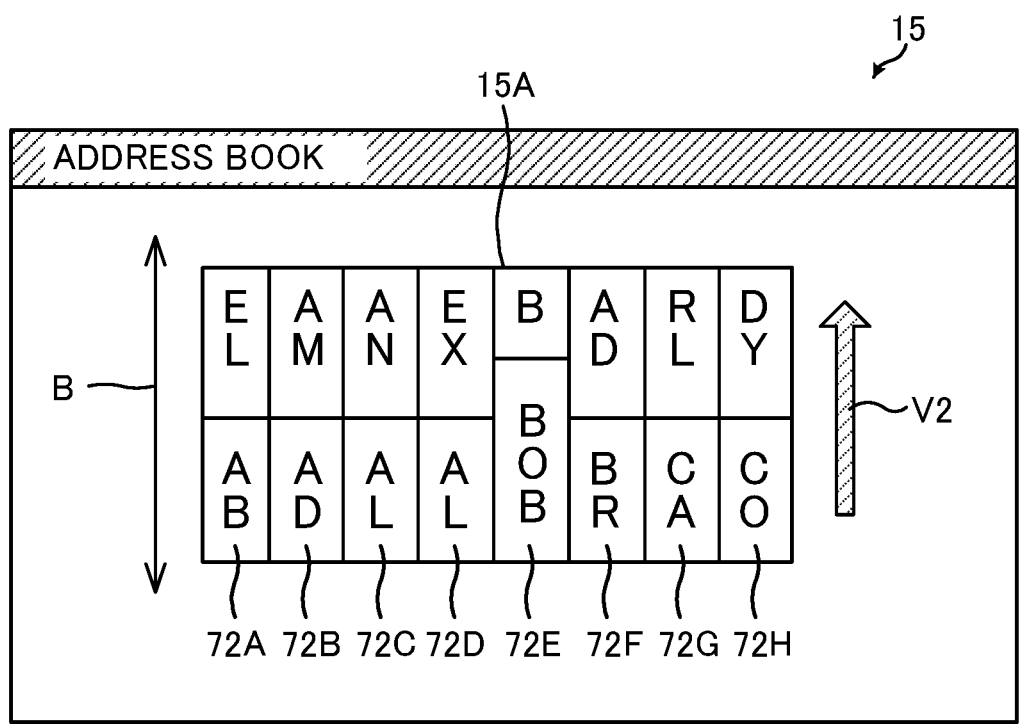
FIG. 11 is a diagram illustrating another example of the mode of the scroll of the second image.

Moreover, a unit in which the scroll is repeated is the second image 70A in the second embodiment described above, but this disclosure is not limited to such an embodiment. FIG. 11 is a diagram illustrating another example of the mode of the scroll of the second images. Referring to FIG. 11, the unit in which the scroll is repeated may be the items 72A to 72H. In this case, since the character string included in the item 72E is composed of three characters, the number of times of repeating this character string is greater than numbers of times of repeating the other items 72A to 72D and 72F to 72H including the character strings composed of four characters.

Note that this disclosure is not limited to the configuration of the embodiments described above and various modifications to this disclosure are also permitted. For example, the embodiments have been described above, referring to the color multifunction peripheral as one embodiment of the display apparatus according to this disclosure. However, this is just one example and thus the display apparatus may be a monochromatic multifunction peripheral. For example, the display apparatus of this disclosure may be another type of image forming apparatus such as a printer, a copier, or a facsimile device, or a portable terminal apparatus such as a smartphone.

Moreover, the configuration and processing of the embodiments described above with reference to FIGS. 1 to 11 form just one embodiment of this disclosure and there is no intention to limit this disclosure to these configurations and processing in any manner.

While the present disclosure has been described in detail with reference to the embodiments thereof, it would be apparent to those skilled in the art the various changes and modifications may be made therein within the scope defined by the appended claims.

What is claimed is:

1. A display apparatus comprising:
a display device;
a touch panel; and
a control device including a processor and functioning as a controller as a result of executing a display change program by the processor,
wherein the controller causes the display device to display, in a display region previously defined, one portion of a first image including a first plurality of items arrayed along a vertical direction, each of the first plurality of items includes a first character string composed of a plurality of characters arrayed along a horizontal direction, the controller calculates, upon receiving scroll operation in the vertical direction via the touch panel, a speed of the scroll operation causes the display device to scroll, in the display region, the first image in the vertical direction, when the calculated speed is equal to or less than a first speed previously defined, and causes the display device to generate, when the calculated speed exceeds the first speed previously defined, a second image including a second plurality of items, in which the first plurality of items is rearranged to be arrayed along the horizontal direction, so as that each of the second plurality of items includes a second character string in which the plurality of characters composing the first character string is rearranged to be arrayed along the vertical direction and so as that a number of the characters in the horizontal direction in the second character string is less than a number of the characters in the horizontal direction in the first character string, and causes the display device to scroll, in the display region, the second image generated, in the vertical direction, and the controller sets a length of the display region in the horizontal direction to be greater than a length of the display region in the vertical direction.

2. The display apparatus according to claim 1, wherein when further scroll operation in the vertical direction is not received via the touch panel during the scroll of the second image, the controller causes the display device to display a portion of the first image, the portion corresponding to one portion of the second image displayed in the display region at a time point at which the scroll of the second image performed based on the already received scroll operation in the vertical direction ends.

3. The display apparatus according to claim 1, wherein the controller upon receiving the scroll operation in the vertical direction via the touch panel during the scroll of the second image, calculates the speed of the scroll operation, when the calculated speed is equal to or less than the first speed, causes the display device to scroll, in the display region, the first image in the vertical direction, from a portion of the first image, the portion corresponding to the one portion of the second image displayed in the display region at a time point at which the scroll operation is received, and when the calculated speed exceeds the first speed, causes the display device to continuously scroll the second image.

4. The display apparatus according to claim 1, wherein the controller generates the second image in a manner such that a size of the characters included in the first image is identical to a size of the characters included in the second image.

5. The display apparatus according to claim 4, wherein the controller causes the display device to display part of the first plurality of items as the one portion of the first image, calculates a number of the items displayable in the display region at once for the second image, calculates switching time required for all the part of items displayed in the display region to be completely switched to another part of the items arrayed next upon scrolling, in the vertical direction, the first image in accordance with a display speed set in accordance with the speed of the scroll operation, based on the calculated number of the items, sets a length of the second image in the vertical direction in a manner such that the number of the characters displayed in the display region in scrolling the first image in accordance with the display speed for the switching time agrees with a maximum number of the characters that can be included in the second image, and causes the display device to repeatedly scroll the second image until passage of the switching time since the reception of the scroll operation in the vertical direction upon scrolling, in the vertical direction, the second image in accordance with the display speed.

6. The display apparatus according to claim 1, wherein the controller causes the display device to scroll, in the display region, the second image in the vertical direction, when the characters included in the first image are in a language previously defined as a language written in horizontal and vertical directions and also when the calculated speed exceeds the first speed previously defined, and causes the display device to scroll, in the display region, the first image in the vertical direction, without scrolling the second image when the characters included in the first image is in a language previously defined as a language written only in the horizontal direction and even when the calculated speed exceeds the first speed previously defined.

7. The display apparatus according to claim 5, wherein when scrolling the second image in the vertical direction in accordance with the display speed, the controller causes the display device to repeatedly scroll each of the plurality of items included in the second image until passage of the switching time since the reception of the scroll operation in the vertical direction.

* * * * *